[11] 3,622,790

| | | |
|---|---|---|
| [72] | Inventor | Alfred T. Zavodny<br>Ponca City, Okla. |
| [21] | Appl. No. | 820,891 |
| [22] | Filed | May 1, 1969 |
| [45] | Patented | Nov. 23, 1971 |
| [73] | Assignee | Continental Oil Company<br>Ponca City, Okla.<br>Continuation-in-part of application Ser. No. 597,502, Nov. 18, 1966, now abandoned. This application May 1, 1969, Ser. No. 820,891 |

[54] METHOD AND APPARATUS FOR MODULATING COHERENT ELECTROMAGNETIC RADIATION
13 Claims, 4 Drawing Figs.

[52] U.S. Cl. .................................................. 250/199, 324/96
[51] Int. Cl. .................................................. H04b 9/00
[50] Field of Search .................................................. 250/199; 331/94.5; 332/7.51; 324/56, 96, 97

[56] References Cited
UNITED STATES PATENTS

| | | | |
|---|---|---|---|
| 3,158,678 | 11/1964 | Anderson | 350/160 |
| 3,175,088 | 3/1965 | Herriott | 250/199 |
| 3,234,390 | 2/1966 | Okaya | 250/199 |
| 3,243,722 | 3/1966 | Billings | 331/94.5 |
| 3,330,957 | 7/1967 | Runnels | 250/199 |
| 3,339,073 | 8/1967 | Hunter | 250/199 |

*Primary Examiner*—Robert L. Griffin
*Assistant Examiner*—Albert J. Mayer
*Attorneys*—Joseph C. Kotarski, Henry H. Huth, Jerome B. Peterson, William J. Miller, David H. Hill and Dunlap, Laney, Hessin and Dougherty

ABSTRACT: A method and apparatus for modulation of coherent electromagnetic radiation by controlled development of wave interference patterns for subsequent detection of time-varying signal indications. One form of apparatus includes a piezoelectric crystal-receiving coherent radiation and being structurally varied along the optical axis in response to a modulating voltage to cause proportionate variation of a predetermined interference pattern projection.

INVENTOR.
ALFRED T. ZAVODNY

BY
William J. Miller
ATTORNEY

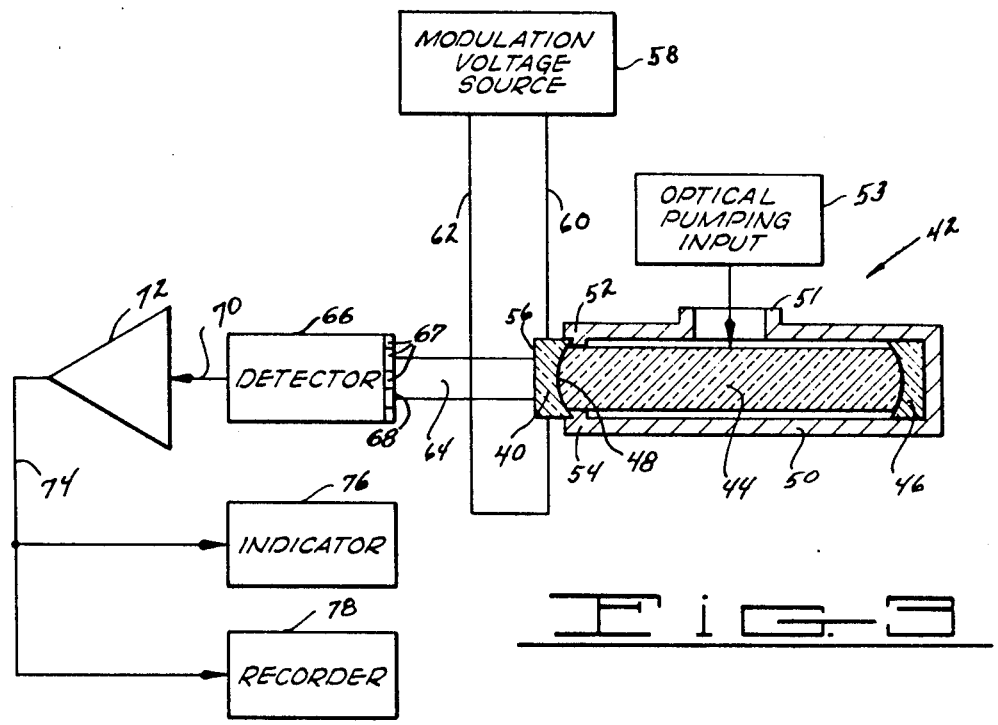

METHOD AND APPARATUS FOR MODULATING COHERENT ELECTROMAGNETIC RADIATION

CROSS-REFERENCE TO COPENDING APPLICATION

This disclosure is a continuation-in-part application including all of the subject matter as disclosed in copending U.S. Pat. application Ser. No. 597,502 now abandoned entitled "Method and Apparatus for Modulating Coherent Electromagnetic Radiation" and filed on Nov. 18, 1966 in the name of Alfred T. Zavodny.

BACKGROUND OF THE INVENTION

1. Field of the Invention

The invention relates generally to modulation of coherent electromagnetic energy and, more particularly, but not by way of limitation, it relates to an improved method and apparatus for effecting a phase modulation of such coherent energy.

2. Description of the Prior Art

Recent development of maser and laser devices, i.e. producers of coherent electromagnetic radiation ranging from the relatively high microwave frequencies upward through the various light frequencies, have brought about various communications applications, and a great amount of recent technological activity has been directed toward the development of methods and apparatus for modulating intelligence or message information for carriage upon the coherent microwaves and light waves. The modulation of the extremely high frequency electromagnetic radiation enables the carrying of an enormous volume of information.

The prior art procedures heretofore employed for modulating coherent radiation, as developed by various stimulated emission techniques, has involved modulation of the intensity of the coherent radiation. This is accomplished either by modulation of the laser power supply (hence, the laser output power) or by modulating the beam intensity with some form of variable attenuation, or by rotating a polarizing material in the path of a polarized beam in synchronous, controlled relationship thereto. The methods involving intensity modulation are vulnerable in each instance to any disturbance which causes the light intensity in the outgoing beam to change, as such changes induced by these extrinsic disturbances becomes an integral part of the modulated light. Intensity modulation also requires a fairly high energy level at the detector in order to enable the intensity variations to be detected.

SUMMARY OF THE INVENTION

The present invention contemplates a new and relatively simple, yet reliable, method for modulating coherent, high frequency electromagnetic radiation. In a more limited aspect, the invention comprises the interpositioning, in the path of coherent, electromagnetic radiation, of a lens which is transparent to the radiation and which is capable of varying the refracting and reflecting paths between its faces in response to an external modulating influence. In one form, the lens is constructed of a piezoelectric material and it is connected to a source of modulating electric voltage. A detector device capable of detecting a phase interference pattern is then placed on the exit side of the lens and in proper location to sense or detect a predetermined phase interference pattern to generate a signal output proportional thereto.

Therefore, it is an object of the present invention to provide a simple but effective method of modulating coherent electromagnetic radiation.

It is another object of the invention to provide a method and apparatus for modulating coherent magnetic radiation which methods does not employ variation in the intensity of the radiation in order to effect such modulation.

It is still further an object of the present invention to provide a relatively inexpensive apparatus for modulating maser and laser beams.

It is also an object of the present invention to provide a method which, by detection and analysis of phase interference patterns produced by coherent radiation, can be employed for studying the refraction and piezoelectric properties of specified material.

Finally, it is an object of the present invention to provide a novel method of communications using phase modulated coherent electromagnetic radiation.

Other objects and advantages of the invention will be evident from the following detailed description when read in conjunction with the accompanying drawings which illustrate the invention.

BRIEF DESCRIPTION OF THE DRAWING

FIG. 3 is a block diagram depicting a slightly modified form of apparatus for carrying out the present invention; and FIG. 4 illustrates alternative structure which may be employed in certain applications to gain advantage of the phase modulation phenomena.

DETAILED DESCRIPTION OF THE INVENTION

Figure 1:
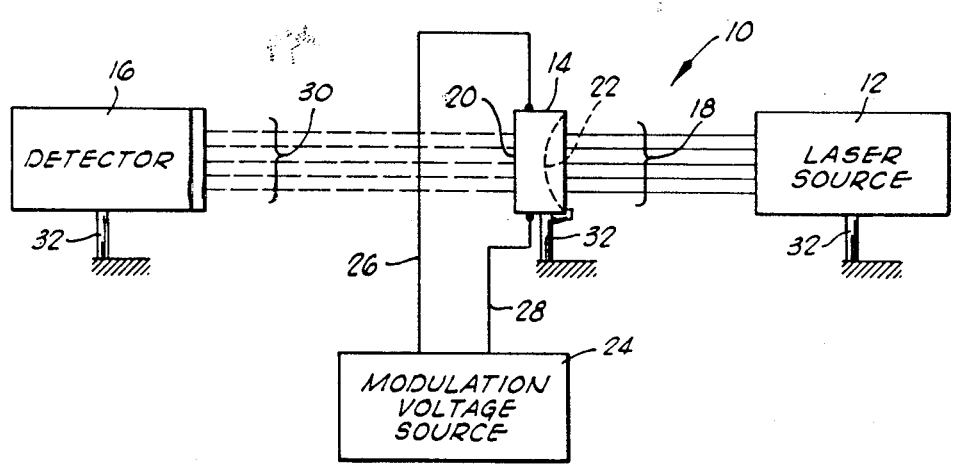
FIG. 1 is a block diagram of one form invention; apparatus which is suitable for practicing the method of the present invention.

Referring now to the drawings in detail, and particularly to FIG. 1, a phase modulation assembly is designated generally by reference character 10 and, in the illustrated embodiment, it includes an excited medium such as laser source 12, a modulating lens 14 and a selected form of detector 16. The laser source 12 may be any of the various well-known types of coherent electromagnetic radiation source of the light amplifying type, and it may include all of the attributes of optical pumping along with the various cooling facilities.

The laser source 12 provides an output of electromagnetic radiation 18 which is a monochromatic, coherent or in-phase beam of radiation which is directed upon modulating lens 14. The modulating lens 14 may be such as a crystalline or piezoelectric lens having a planar exit face 20 and a concave entry face 22. The modulation voltage source 24 provides a suitable modulating voltage via leads 26 and 28 for connection to opposite sides of the piezoelectric modulating lens 14 such that its crystalline structure can be contorted to lengthen the lens axially, by varying amounts in proportion to the modulating voltage. A phase modulated beam of radiation 30 is then directed from the exit face 20 of modulating lens 14 toward a suitably disposed detector 16. It is important that each of laser source 12, modulating lens 14 and detector 16 be firmly secured as by securing members 32 to whatever that functions as an operating base or platform. It is necessary that these elements remain fixed in position, or at least that they move at a much lower frequency than the modulating frequency in order that they do not contribute appreciably to phase modulation of beam 18.

Phase modulation is effected when a modulating signal is applied to the piezoelectric modulating lens 14 from modulation voltage source 24, this causing the geometry of the modulating lens 14 to vary in response to the modulating signal. Such variation in the geometry of modulating lens 14 causes the coherent radiation passing therethrough to be bent and internally reflected through varying different angles such that emergent rays will travel through paths of different effective lengths before converging to establish the phenomena of interference at a location which is selected as an interface for positioning of detector 16. As a result of a change of effective path lengths, the phase modulated radiation beam 30 will project an interference pattern upon detector 16 for establishment of a correlation between changes in the interference pattern and the modulating signal as applied to the modulating lens 14.

The detector 16 of FIG. 1 may be any suitable detector device which is capable of detecting the existence and character of the interference pattern, and in responding to proportional changes in such interference pattern. For example, where the coherent radiation is developed by a laser device, and is thus in the visible portion of the spectrum, an array of minute, highly sensitive photodetector devices can be employed as the detector 16. The use of a detector of this type for depicting phase interference patterns is discussed in greater detail in copending U.S. application Ser. No. 511,717 filed on Dec. 6, 1965, and assigned to the assignor of the present application. In a preferred arrangement of apparatus for practicing the method of the invention, the detector 16 will also include some form of readout apparatus which can receive signals developed by the detector, in response to changes in the interference pattern detected thereby, and then visually or otherwise portray the character of such changes.

Before discussing in detail the manner in which the modulating lens 14 functions in reflecting and refracting incident rays of coherent radiation so as to develop the interference pattern essential to the practice of the present invention, there follows a description of the general mode of operation of the apparatus as shown in the block diagram of FIG. 1. As in the typical and well understood laser action, laser source 12 performs light amplification until sufficient energy is developed to permit escape of a beam of coherent radiation from the excited light-amplifying medium therein. The laser will generate an oscillator output which depends upon selective amplification of one of the single frequency modes of the resonant cavity containing whatever the active laser medium. Such output wave or radiation bundle 18 would be monochromatic as well as in-phase over the whole surface of radiation of laser source 12.

As the emitted beam of coherent radiation passes through the modulating lens 14, the geometry of this body will result in some of the waves passing therethrough being refracted or bent into different directions of travel, and others of the waves being partially reflected between the opposed surfaces of the modulating lens 14, these rays or waves ultimately emerging from the exit surface 20 of modulating lens 14 along an altered path from that its original emission. Such rays emerging from the lens of the exit face 20 thereof are thus, in many instances, traveling along convergent paths, and the convergent rays will ultimately cross and establish phase interference pattern each with the other. By positioning the detector 16 at the proper distance from the rear face of the modulating lens 14, the detector can be made to respond to the intensity of the radiation at various points within the interference pattern such that it produces a signal which is indicative of the nature of the interference pattern, and which signal will be proportionately varied in correspondence to variations in this interference pattern.

By connection of the modulation voltage source 24 to the modulating lens 14, and by constructing the modulating lens 14 of piezoelectric material, the geometry of the lens can be made to change in correspondence to changes in the applied voltage which is developed between leads 26 and 28. A change in the geometry of modulating lens 14, in turn, changes the refracting and reflected properties of the modulating lens 14 such that the rays of coherent radiation which are incident upon the entry face 22 of the modulating lens 14 are then bent and reflected through myriad different paths than those paths through which they were bent and reflected prior to the described change in the geometry of the modulating lens 14. This will then result in a proportionate change in the interference pattern, as produced at some given plane, in response to the change in refraction and reflection of the waves of coherent radiation, and this change in the interference pattern is sensed by the detectors 16 for provision of an indication of the modulating signal as applied to the modulating lens 14.

When the apparatus of FIG. 1 is employed for physical testing it is merely necessary to substitute a properly shaped crystalline specimen into the system as the modulating lens 14. Inspection of interference fringing effects versus modulation voltage input will allow compilation of varied properties and characteristics of the specimen material.

Figure 2:
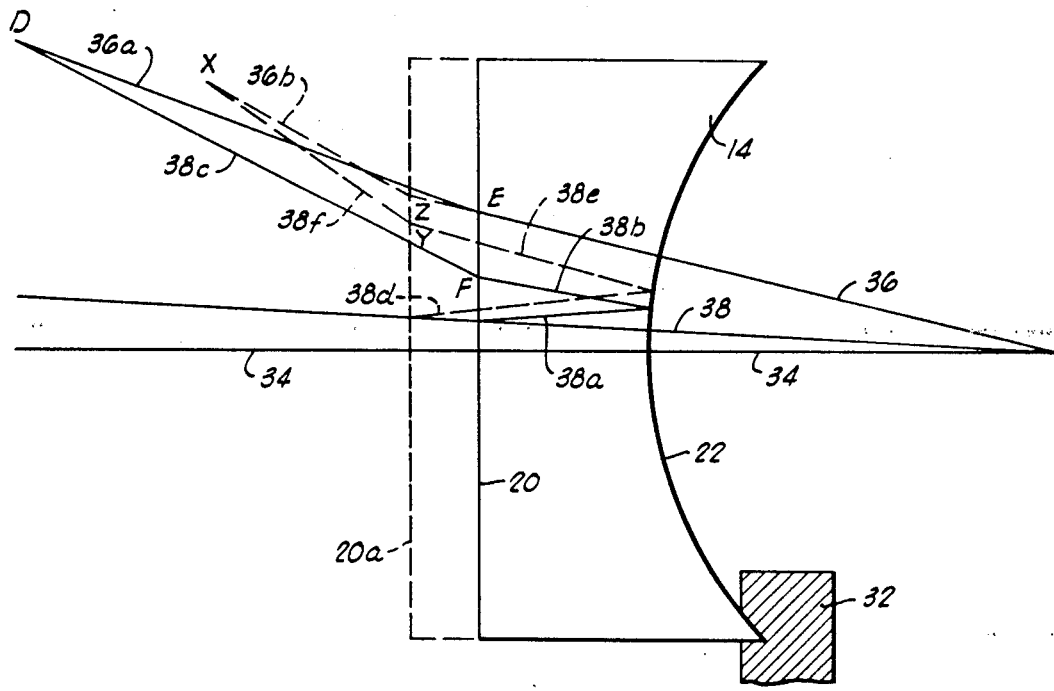
FIG. 2 is a geometric diagram illustrating selected ray paths from a selected point source through a lens of variable dimension.

Having described the general method of operation relative to the apparatus of the block diagram of FIG. 1, the manner of establishment of phase interference phenomena will next be discussed in greater detail. Referring to FIG. 2 of the drawings, an initial, unmodulated geometry of the modulating lens 14 is illustrated in full lines, while the altered geometry of the modulating lens 14, after application of a modulating signal thereto, is illustrated in dash-lines. The geometric change in the piezoelectric material of the modulating lens 14 is made to occur as a thickening thereof along the lens axis or the axis of propagation of the coherent radiation.

Upon application of a modulating signal to modulating lens 14, structural change occurs to move exit face 20 to the position of exit face 20a (dash-lines) as lens movement is away from the plane of affixture at securing fasteners 32 adjacent entry face 22. Consistent with the dashed-line portrayal of the altered modulating lens geometry, the paths of the direction of propagation of the waves of coherent radiation passing through the modulating lens are depicted in solid lines (wave travel prior to alteration of the lens geometry), and in dashlines as the waves would travel after the lens may have been thickened to some extent by the application of a modulating signal.

For convenience of illustration, let it be assumed that the coherent radiation passing through the modulating lens 14 originates at point source S. Let it further be assumed that the point source S of the coherent radiation coincides with the focal point of the spherically concave entry face 22 of the modulating lens 14. Under these circumstances, a ray 34 will pass through modulating lens 14 in a straight line and it will not be refracted at the rear face 20. A ray 36 will pass through the modulating lens 14 to the exit face 20 in a straight line. At the exit face 20, the ray 36 will be refracted slightly and will emerge from the modulating lens 14 along the path 36a. Another ray 38 will also pass in a straight line through the modulating lens 14 until it reaches the exit face 20 of mirror lens 14. At this point, the ray 38 may be partially reflected along line 38a to impinge upon the entry face 22 of the modulating lens 14. Partial reflection again occurs at entry face 22 whereupon the ray passes through the modulating lens 14 along path 38c.

The angles of refraction of the emergent rays 36a and 38c are different so that these two refracted rays ultimately converge and cross at point D. Phase interference thus occurs at point D and, as is well understood in the art, if the difference between the effective path lengths of the rays 36 and 38 from their respective source points to the point of interference is $m\lambda$, where $\lambda$ is the wavelength of the coherent radiation, and $m$ is a whole number, constructive interference will result at point D. If, on the other hand, the difference in the effective path lengths between the two rays is $(m+\frac{1}{2})\lambda$, destructive interference will result, and a dark spot (or ring or line depending upon particular applications) will result in the interference pattern. For the point source illustration, a detector located anywhere within the triangle DEF will detect proportionate variations in interference pattern. However, it should be understood that, in actual practice, all rays emerging from exit face 20–20a, are to be utilized and a suitable detector is so located within the main beam to view a significant portion thereof for fringing effects.

Let it now be assumed that a modulating signal is applied to the piezoelectric modulating lens 14, and that this signal causes the thickness of the lens to be varied so that the rear face of the lens moves to the position indicated by the dashline 20a. The ray 38 will then be reflected from this rear face along a path 38d, and it will also be partially reflected from entry face 22 along a path 38e. Finally, the emergent ray will be refracted at the exit face 20a to follow the path 38f.

On the other hand, the ray 36 will pass through the lens in a straight line until it reaches the exit face 20a at which point it will be refracted upon its emergence from the modulating lens 14 so that it follows a path 36b. The rays 36b and 38f will then intersect or cross at point X. Thus, by changing the physical dimensions of the modulating lens 14 by application of a modulating signal thereto, the interference pattern observed at a selected plane to the exit side of modulating lens 14 will be altered. The emerging rays are directed through paths having different effective lengths with the result that the phase interference occuring at point X would be different from that occurring at point D. Thus, for example, by positioning detector 16, i.e. the photoresponsive array, at some location within the triangle XYZ, variations of interference pattern ranging between extremes may be accurately detected, and signals developed by the detector can be used to operate a suitable form of readout device to provide indication of the nature of the applied modulated signal.

FIG. 3 illustrates an alternative form of apparatus for performing the method of the invention which includes a modulating lens 40 that also forms an integral part of a laser device 42. Thus, laser device 42 may utilize a laser energy material 44, e.g. ruby, neodymium-glass, neodymium-yttrium aluminum garnet, etc., which is positioned between end reflector lenses 40 and 46. The concave or entry face 48 of modulating lens 40 is treated so that it is semitransparent to allow high energy radiation to escape thereby to form a laser output beam. Thus, modulating lens 40 acts both as a mirror in the laser system and, since it is formed from selected piezoelectric material, it is capable of acting as a phase modulating device on the output laser beam.

The laser device 42 is enclosed in a suitable rigid frame 50 which serves to maintain all distance parameters of the laser system constant and at their critical lengths. Thus, the frame 50 includes a suitable form of end clamps 52 and 54 which secure modulating lens 40 adjacent its entry end. The frame 50 may include an access entry 51 for application of input power from such as optical pumping input 53. Modulating lens 40 is so secured that the concave entry face 48 is constant with respect to laser material 44 while the remaining portion of the piezoelectric modulating lens 40, that extending toward exit face 56, is capable of structural change along the lens axis to create the necessary interference fringe changes as will be further described.

A suitable form of modulation voltage source 58 is connected by means of leads 60 and 62 to opposite sides of the piezoelectric modulating lens 40. The modulation voltage source 58 might be any form of input electric signal bearing selected intelligence, and the axial thickness of modulating lens 40 is varied in proportion to such input voltage. In the manner previously described then, the output laser beam 64 is phase modulated in that an interference fringe pattern borne thereon will be varied in proportion to the input modulation voltage from modulation voltage source 58.

The phase modulated laser beam 64 is focused in preselected manner on the detecting surface of a detector 66 which may be a device similar to that previously described. Thus, a plurality of individual detector elements 67 within detector face 68 are securely positioned for viewing of the interference pattern when at a preset null or unmodulated position. Thereafter, changes in the laser beam 64, as brought about by modulation voltage input, will cause proportional changes in the output of individual detector elements 67 whether they be aligned with light or dark fringing effects in the interference fringe pattern. The output from the detector 66, a time-varying signal indicative of the selected modulation, is then applied via output 70 to a suitable amplifier 72, and an amplified output is available on lead 74 for various employ such as in an indicator 76 or a selected form of recorder 78.

FIG. 4 illustrates an alternative form of apparatus capable of taking advantage of the present phase modulation teaching wherein standard planar mirrors are employed. Such planar mirrors are provided for use with many types of laser devices and they are actually designed with a slight wedge shape (that is, the opposed faces do not extend in absolute parallelism), this type of mirror-lens constitutes a preferred piezoelectric mirror-lens or modulating lens for use in the present invention. The two opposed mirrors used for reflecting the light to be amplified back and forth within the excited laser medium are designated by numerals 80 and 82. The excited medium is schematically illustrated at 84. Each of the mirror-lens 80 and 82 includes a forward face 80a and 82a, respectively, at a rear face or exit face 80b and 82b, respectively. The rear faces 80b and 82b depart from parallelism with their corresponding forward faces 80a and 82a by an angle alpha. The mirror-lens are constructed with such nonparallel front faces that the reflection of the oscillating light beam from the rear face of the mirror-lenses will not be directed back into the excited medium of the laser.

When the laser develops a collimated beam of amplified coherent radiation which impinges upon and passes through the mirror-lens 80, two rays 86 and 88 located adjacent the outer periphery of the beam will be refracted and reflected in the manner previously described in referring to FIG. 2. Thus, the portion of the ray 88 which has been reflected from the year face 80b and the forward face 80a of the mirror-lens emerges from the mirror-lens along the path 88a. The ray 86 passes through the mirror-lens 80 and is refracted at the rear face 80b thereof so that the emergent ray passes along the path 86a. The rays traveling the emergent paths 86a and 88a intersect at point L so that phase interference occurs within the triangular zone LMN. By locating a suitable detector within the zone, the character of an interference fringe pattern may be sensed as the pattern changes with the application of a modulating signal to the piezoelectric material of the mirror-lens 80. It should be noted that the desirable phase modulated beam of planar mirrors such as 80 and 82 would only exist for a short length as indicated by the arrow line D denoting the distance L to M adjacent the exit face of mirror lens 80.

In the use of the described apparatus for modulating a beam of coherent electromagnetic radiation, it ill be apparent that the mirror-lens employed as well as the detector and source of radiation should be maintained at a fixed or stationary location, or at least they should move at a lower frequency from that which characterizes the modulating signal. It will also be apparent that even though the invention has been discussed primarily with reference being made to the use of the method as a communication technique, the method will find particular use in the evaluation of piezoelectric and optical properties of specified piezoelectric substrate materials.

That is, a selected piezoelectric specimen may be interposed into a laser beam with proper securing at the necessary distances and, thereafter, application of a modulating voltage thereto will give specific information as to crystal structure upon calibrated detection of interference fringe pattern changes. A direct relationship will exist between the modulating voltage applied to the crystal, the crystal stress and disfiguration or axial extension, interference fringe changes per distance, etc. to enable compilation of various crystalline physical properties.

Although certain specific embodiments of the invention have been herein described in order to provide an example of the manner in which the invention can be practiced in accordance with fundamental principles upon which it is based, it will be understood that various modifications and changes to the depicted and described structure, as well as the steps of the method as herein discussed, can be effected without departure from the basic principles of the invention. All modifications and changes of this type which do not involve a departure from the basic principles of the invention are deemed to be circumscribed by the spirit and scope of the invention.

What is claimed is:
1. A method of modulating a beam of coherent electromagnetic radiation comprising:
 interposing in the path of the beam of coherent electromagnetic radiation, a piezoelectric body capable of developing a phase interference pattern in the beam of coherent electromagnetic radiation such that the light and dark fringing effects of the phase interference pattern can be correlated to the instantaneous geometry of said body;

positioning a detecting device at a selected location along said beam in exposure to the phase interference pattern developed in said beam by said piezoelectric body, thereby to detect changes in physical character of said light and dark fringing effects and to provide an output indication proportional to said changes; and applying a modulating electric signal to said piezoelectric body to vary the geometry of said body and therefore the fringing effects of the interference pattern in proportion thereto.

2. A method of modulating a beam of coherent electromagnetic radiation as defined in claim 1 wherein said detecting device is positioned in spaced relation to said piezoelectric body and is located between said body and the farthest point from said body at which any two waves of radiation in said beam cross each other to produce phase interference.

3. A method of modulating a beam of coherent electromagnetic radiation as defined in claim 1 and further characterized to include the step of maintaining said detecting device and the source of said beam of coherent radiation in a fixed position during the application of said modulating electric signal to said piezoelectric body.

4. A method of modulating a beam of coherent electromagnetic radiation as defined in claim 1 wherein said piezoelectric body is a lens which refracts at least a portion of the electromagnetic radiation passing therethrough, and which internally reflects at least a portion of the electromagnetic radiation passing therethrough.

5. A method of modulating a beam of coherent electromagnetic radiation as defined in claim 1 wherein said piezoelectric body is formed by shaping a specimen of predetermined material as a lens capable of refracting and internally reflecting visible electromagnetic radiation to produce said phase interference patterns, such interference patterns being characteristically identifiable with said specimen.

6. Apparatus for communicating using coherent electromagnetic radiation comprising:

a source of coherent, substantially monochromatic electromagnetic radiation;

a piezoelectric body interposed in the coherent electromagnetic radiation originating at said source, said body having geometric and radiation transmission properties such that rays of said radiation passed therethrough are bent into converging paths resulting in the development of a phase interference pattern exhibiting characteristic light and dark fringing effects at a selected location spaced from said body;

means for applying a modulating electrical signal to said piezoelectric body to change the geometric and radiation transmission properties thereof;

detection means positioned at said selected location for detecting proportionate changes in said fringing effects of the radiation interference pattern as said modulating electrical signal is applied to said piezoelectric body to change the radiation transmission properties thereof; and output means controlled by said detection means to provide continual output indication of said proportionate changes in fringing effects.

7. Apparatus for communicating as defined in claim 6 wherein said means for applying a modulating electrical signal comprises a source of variable voltage connected to said piezoelectric body.

8. Apparatus for communicating as defined in claim 6 wherein said source of coherent, substantially monochromatic electromagnetic radiation comprises a laser.

9. Apparatus for communicating as defined in claim 8 wherein said piezoelectric body is a lens device which alters the course of light waves impinging thereon.

10. Apparatus for communicating as defined in claim 8 wherein said detecting means comprises a plurality of photodetector devices.

11. Apparatus for communicating as defined in claim 10 wherein said output means includes a readout device connected to said photodetector devices for indicating to the senses of an observer the character of changes in said phase interference pattern.

12. Apparatus for communicating as defined in claim 9 wherein said lens has a reflecting surface and said lens is positioned adjacent the excited laser medium of said laser and reflects light into said excited laser medium to develop light oscillation therein.

13. Apparatus for communicating as defined in claim 11 wherein said piezoelectric body is a lens which refracts light waves passed therethrough, and which internally reflects between its surfaces, a portion of the light which enters the body; and wherein said means for applying a modulating electric signal comprises a source of variable voltage connected to said lens.

* * * * *